United States Patent [19]

Bartlett et al.

[11] Patent Number: 4,566,510

[45] Date of Patent: Jan. 28, 1986

[54] WORKPIECE SUPPORT SYSTEM FOR A POWER TOOL

[75] Inventors: Robert L. Bartlett, Dayton; Charles J. Haas, Middletown; John G. Legler, Huber Heights, all of Ohio

[73] Assignee: Shopsmith, Inc., Dayton, Ohio

[21] Appl. No.: 552,596

[22] Filed: Nov. 16, 1983

[51] Int. Cl.$^4$ ............................................... B27C 9/02
[52] U.S. Cl. ................................ 144/1 C; 144/286 A; 108/102; 83/477.2
[58] Field of Search .................. 144/1 R, 1 C, 286 R, 144/286 A, 287, 288.5; 269/69, 70, 88, 289 R, 901; 83/477.2, 648, 859; 108/83, 88, 90, 102, 143; 248/172, 290, 310, 670

[56] References Cited

U.S. PATENT DOCUMENTS

| | | | |
|---|---|---|---|
| 1,661,868 | 3/1928 | Armstrong et al. | 403/104 |
| 2,747,626 | 5/1956 | Goldschmidt | 144/1 R |
| 2,927,612 | 3/1960 | Edgemond, Jr. et al. | 144/1 C |
| 2,945,516 | 7/1960 | Edgemond, Jr. et al. | 83/473 |
| 3,021,881 | 2/1962 | Edgemond, Jr. et al. | 83/438 |
| 3,282,309 | 11/1966 | Parker et al. | 144/1 R |
| 3,428,307 | 2/1969 | Hunter et al. | 108/83 |

FOREIGN PATENT DOCUMENTS 63122 1/1941 Norway ............................. 248/670

*Primary Examiner*—W. D. Bray
*Assistant Examiner*—Jorji M. Griffin
*Attorney, Agent, or Firm*—Biebel, French & Nauman

[57] ABSTRACT

A workpiece support system for a power tool, preferably a multipurpose woodworking tool of the type having a frame, a main table mounted on the frame, and a power-driven tool member associated with the main table. The support system comprises a first pair of tubular rails attached to longitudinal sides of the main table, a pair of extension rods telescoping within the rails, an auxiliary table having a second pair of rails attached thereto which telescope over and are supported by the protruding portions of the rods. The support system includes capstan screws for releasably locking the extension rods to the pairs of rails. The system may include at least one secondary table mounted on the frame and having a third pair of rails telescoping over ends of the protruding portions and including similar locking means. Another embodiment includes a side frame for supporting long workpieces. The combination of the main table, auxiliary table and secondary table provides a rigid, level and adjustable workpiece supporting surface.

7 Claims, 9 Drawing Figures

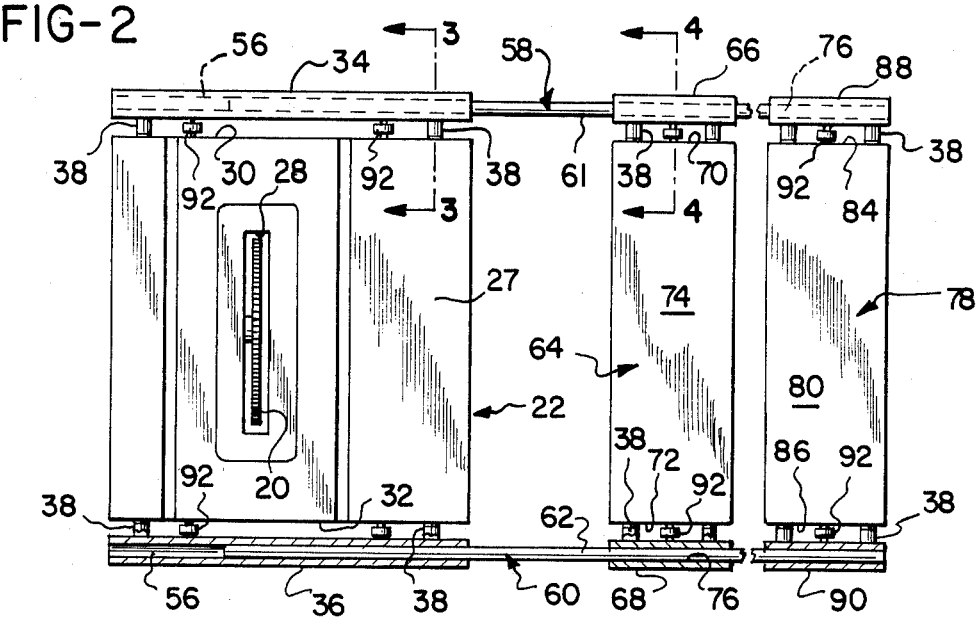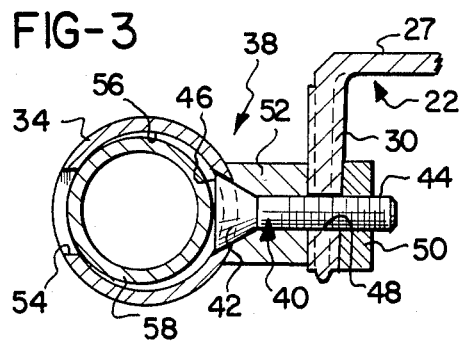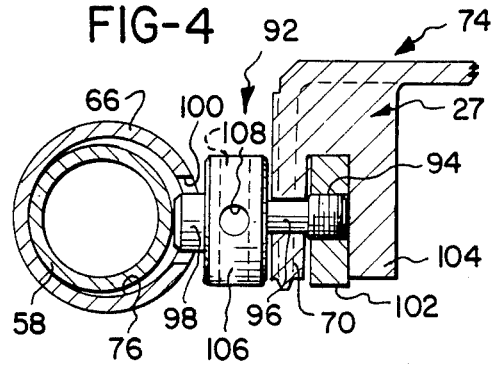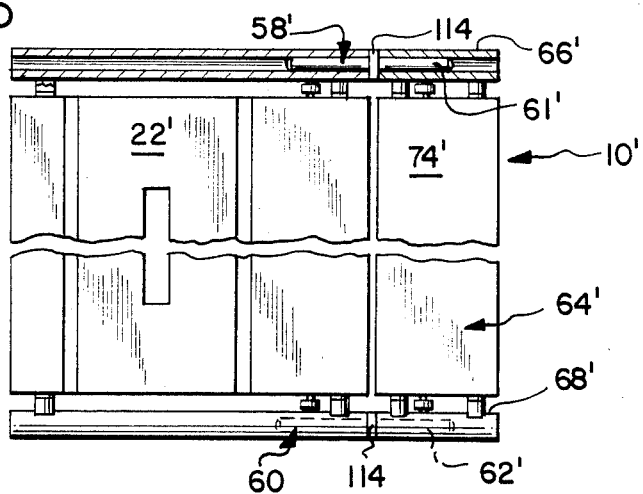

WORKPIECE SUPPORT SYSTEM FOR A POWER TOOL

BACKGROUND OF THE INVENTION

The present invention relates to power tools and, more particularly, to adjustable workpiece supporting tables used in combination/multipurpose woodworking tools.

A multipurpose woodworking tool consists of a frame, an electric motor mounted in a headstock on the frame and having an output shaft to which is attached a tool member such as a saw blade, and a main table having a substantially planar surface for supporting a workpiece. The main table typically is mounted on the frame and is adjustable so that the supporting surface can be pivoted relative to the horizontal. The saw blade or other tool member extends upwardly through a slot in the main table, so that a workpiece may be slid across the supporting surface to engage the tool member.

In order to provide a capability of performing bevel cuts, the saw table typically is pivotable at least 45° toward and away from the headstock. Consequently, the table must be made sufficiently narrow to be tilted without contacting the frame supporting the table.

With some multipurpose tools, the headstock and table are adjustably mounted on a pair of rails or tubes which can be tilted from a horizontal position to a vertical one, so that the motor is above the table with the output shaft extending downwardly to it. In this configuration, the multipurpose tool functions as a drill press. However, to provide a supporting surface for the drill press, the table must be tilted 90° so that it is perpendicular to the axis of the output shaft. To accomplish this, the main table typically is relatively narrow in width contacting the table support structure and preventing further tilting movement.

In order to provide a support for relatively long workpieces when the rails are in a horizontal position, woodworking tools having short main tables often include a secondary table, mounted on the frame a distance from the main table, for supporting the end of a workpiece. Such a device is disclosed in the Edgemond, Jr. et al. U.S. Pat. No. 2,927,612. That patent discloses a multipurpose woodworking tool having a support frame, a headstock which encloses an electric motor and is adjustably mounted on a pair of horizontal rails, a pivotable main table adjustably mounted on the rails and positioned adjacent the headstock, and a secondary table, mounted on an end of the frame.

Since the secondary table is fixed horizontally relative to the frame, the locations of the headstock and main table along the rails must be adjusted so that the distance from the main table to the secondary table is appropriate to support a particular workpiece. To support a large workpiece, time-consuming steps of repositioning both the headstock and main table on the horizontal rails may be required. Furthermore, should it be necessary to provide a secondary table on an opposite side of the main table, the secondary table must be removed from its support on one end of the frame and reattached to the opposite end of the frame.

An alternate apparatus is disclosed in the Edgemond, Jr. et al. U.S. Pat. No. 3,021,881. That patent discloses a power table saw in which the main table is integral with the frame that supports the motor and saw blade. A pair of rails are adjustably attached to opposite sides of the main table and support cross members which are adjustable in position relative to the rails and main table, so that a portion of a workpiece extending sidewardly from the main table is supported by a cross member. While this arrangement provides a measure of adjustability in terms of a workpiece supporting surface, it would be unacceptable for use with a pivoting table, since the relatively long rails would limit the degree to which the main table supporting them could be tilted from the horizontal.

The rails of that device are in the form of an open channel, and hence possess relatively weak beam strength. The cross members clamp to the rails along a relatively small portion of the rail length, so that the overall structure does not possess sufficient rigidity for supporting relatively massive workpieces or for providing support during difficult cutting operations.

Accordingly, there is a need for a workpiece support system which supports workpieces which are longer than the typical main table of a multipurpose woodworking tool, yet do not hinder the ability of the main table to be pivoted from the horizontal. Furthermore, such a system should be capable of providing an adjustable and rigid support for relatively massive workpieces or workpieces which are difficult to machine.

SUMMARY OF THE INVENTION

The present invention provides a workpiece support system for a stationary power tool, such as a multipurpose woodworking tool, in which the size and location of the workpiece support area can be varied relatively easily. Furthermore, the support system provides a workpiece support surface which is extremely rigid and is capable of supporting workpieces which are massive or difficult to machine. At the same time, the support system is capable of providing extended support area on either side of, and/or behind, the main table by adjustments which require relatively little time or effort from an operator.

The workpiece support system is used in combination with a multipurpose power tool of the type having a frame which supports a power driven tool member such as a circular saw blade or disk sanding wheel, and includes a main table pivotally mounted on the frame and having a first pair of rails attached to opposing longitudinal sides of the table and extending substantially parallel to each other, each rail having a hollow, continuous interior, one or more pairs of extension rods telescoping within the rail interiors, and at least one auxiliary table having a second pair of rails telescoping over portions of the extension rods protruding from the first pair of rails. In a preferred embodiment, the system includes means for locking the extension rods to the pairs of rails which comprises pairs of capstan screws having shanks threaded into nuts fixed to the sides of the tables, and opposite ends extending through adjacent portions of the rails to contact the extension rods. The capstan screws accept a standard allen wrench so that they may be rotated in a first direction to displace them outwardly from the sides of the tables to clamp the extension rods to the interiors of the rails, or rotated in a reverse direction to displace the screws inwardly, thereby releasing the extension rods and permitting sliding movement of the extension rods relative to the main and auxiliary tables.

The auxiliary table is also capable of being positioned on an opposite side of the main table. The extension rods are released from their locking engagement with the first pair of rails of the main table and are displaced longitudinally relative to the main table to protrude outwardly from opposite ends of the first pair of rails. The auxiliary table is then mounted on the protruding portions of the extension rods on the opposite side of the main table, and both the main and auxiliary tables are locked to the extension rods to form a rigid, unitary support. Alternately, extension rods may be used which protrude from both sides of the main table, and auxiliary tables are mounted on both sides of the main table.

In a preferred embodiment, the workpiece support system includes a secondary table which is mounted on the frame supporting the main table. The secondary table includes a pair of rails positioned to receive the ends of the protruding portions of the extension rods, so that one or more auxiliary tables may be suspended between the main and secondary tables on the extension rods. The rails of the secondary table also include a locking mechanism so that all of the components of the support system may be locked together to provide a rigid structure. A number of auxiliary tables can be suspended between the main and secondary tables to form a continuous supporting surface simply by sliding the auxiliary tables onto the extension rods, then locking them in position.

In another embodiment, the system includes two secondary tables, positioned at each end of the woodworking tool, and extension rods are used on each side of the support system which are sufficiently long to protrude from the outside ends of the secondary tables. These ends attach to a lateral support frame extending along a side of the tool so that the support area is increased in the direction a workpiece is fed into the blade. An auxiliary working surface, such as a sheet of plywood, is positioned on the support frame to greatly increase the available table surface. Large and long workpieces, such as sheet materials, can be supported more easily for cutting with this support frame and are prevented from falling off the back of the main table which can damage the workpiece. This frame eliminates the need for a record person or a roller stand to support the free end of a workpiece.

Preferably, each of the rails comprising the pairs of rails attached to the tables is in the form of a tubular conduit having substantially continuous walls. This structure adds beam strength to the rails so that the rails resist bending stresses exerted by massive workpieces. Since the support system can be constructed without having to pierce or penetrate the extensions, they preferably take the form of metal tubes with continuous walls which add strength and rigidity to the table structure. In order to provide a full range of pivotal movement for the main table, the extensions and auxiliary table can be readily removed from the main table so that the main table may be pivoted without the obstructions which would be created by non-removable table extensions.

Accordingly, it is an object of the present invention to provide a workpiece support system having a main table and an auxiliary table which can be adjusted to vary the spacing between the main and auxiliary tables; a support system in which an auxiliary table can be positioned on either side of a main table without requiring a number of time consuming steps by an operator; a support system which can accommodate a secondary table at each end of an associated support frame, so that auxiliary tables may be suspended between the secondary tables and main table; a system which can be adjusted to support large and long workpieces; a support system which provides a relatively rigid and strong workpiece supporting surface; and a support system which can be rapidly disassembled to allow the main table to be pivoted freely.

Other objects and advantages of the invention will be apparent from the following description, the accompanying drawings and the appended claims.

BRIEF DESCRIPTION OF THE DRAWINGS

FIG. 2 is a plan view of the main, auxiliary and secondary tables of the support system of FIG. 1 in which the rails on one side are in section;

FIG. 3 is a detail cross-sectional view of a typical rail mount taken on line 3—3 of FIG. 2;

FIG. 4 is a detail cross-sectional view of a typical locking mechanism, taken on line 4—4 of FIG. 2;

FIG. 5 is a plan view of an alternate embodiment of the invention, utilizing a different type of extension and in which the central part of the tables is broken away;

DESCRIPTION OF THE PREFERRED EMBODIMENTS

Figure 1:
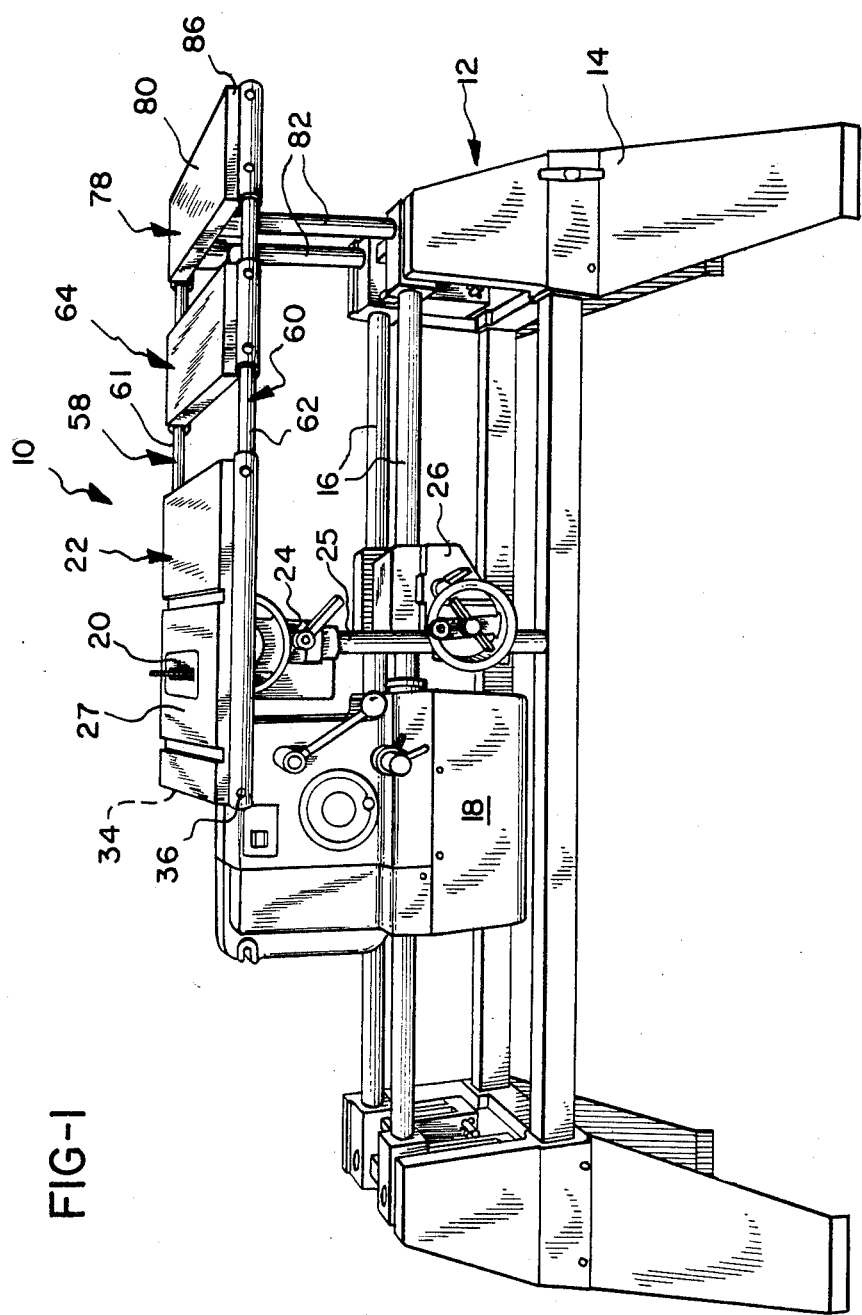
FIG. 1 is a perspective side view of a multipurpose woodworking power tool incorporating the workpiece support system of the present invention.

As shown in FIG. 1, the workpiece support system, generally designated 10, is mounted on a multipurpose woodworking tool 12. The woodworking tool 12 includes a frame 14 which supports a pair of parallel, horizontally extending way tubes 16. A headstock 18 is adjustably mounted on the way tubes 16 and includes an electric motor driven quill spindle on which is mounted a tool attachment such as a saw blade 20. It should be noted that other types of tool attachments, such as sanding disks, may be mounted on the quill spindle of the headstock without departing from the scope of the invention. The components described thus far are all well-known in the art and are typical of many high quality multipurpose woodworking tools. The details of the construction of the headstock 18 are described more fully in Edgemond, Jr. et al. U.S. Pat. No. 2,927,612, the disclosure of which is incorporated herein by reference.

A main table 22 is adjustably mounted on the way tubes 16 by a structure including a pivot 24, support legs 25 and carriage 26, all of a type well-known in the art such as, for example, the structure disclosed in Goldschmidt U.S. Pat. No. 2,747,626, the disclosure of which is incorporated herein by reference. Preferably, a table may be used of the type disclosed in U.S. Application Ser. No. 531,978, filed Sept. 14, 1983, the disclosure of which is incorporated herein by reference. As shown in FIGS. 1 and 2, the main table 22 includes a substantially rectangular support plate 27 having a rectangular opening 28 through which the saw blade 20 extends.

The support plate 27 includes opposing walls 30, 32 to which are attached hollow, tubular rails 34, 36, respectively. The rails 34, 36 are joined to the opposing walls 30, 32 by brackets 38. As best shown in FIG. 3, each bracket 38 includes a screw 40 having a flat, frustoconical head 42 and a shank 44 which passes through a correspondingly shaped opening 46 in the adjacent rail 34, and an opening 48 in wall 30. The flat head 42 of the screw 40 engages the area of the rail 34 surrounding the opening 46, and the shank 44 is retained within the opening 48 by a locking nut 50. Alternately, the screw 40 could be threaded directly into the wall 30. The rail 34 is spaced from the wall 30 by a ferrule 52. An access opening 54 is formed in the wall of the rail 34 opposite the opening 46 so that the screw 40 can be attached and removed from within the rail 34 by a screwdriver.

The brackets 38 are constructed so that the interiors 56 of the rails 34, 36 are continuous and unobstructed. In addition, the cylindrical walls of the rails 34, 36 are relatively continuous with few holes, so that the inherent beam strength of the rails is not reduced substantially.

As shown in FIGS. 1 and 2, the rails 34, 36 telescopically receive extension rods 58, 60, respectively, which are in the form of cylindrical tubes. The extension rods 58, 60 are inserted within the interiors 56 of the rails 34, 36 so that each has a protruding portion 61, 62, respectively, extending outwardly from its associated rail.

An auxiliary table 64 includes rails 66, 68 attached to side walls 70, 72 thereof by brackets 38. The side walls 70, 72 are part of a support plate 74 which is similar in structure to the support plate 27 of the main table 22. The construction of the rails 66, 68 and brackets 38 are similar to their counterparts which are attached to the main table 22. The interiors 76 of the rails 66, 68 are sized such that the auxiliary table 64 can be slidably displaced along the extension rods 58, 60. Similarly, the interiors 56 of the rails 34, 36 are sized such that the extension rods 58, 60 can be slidably displaced relative to the rails and main table 22.

A secondary table 78 (also shown in FIG. 1) includes a support plate 80 which is supported by legs 82 journaled in an end of the frame 14 in a manner well-known in the art. The support plate 80 includes side walls 84, 86 to which rails 88, 90 are attached by brackets 38. The construction of the side walls 84, 86, rails 88, 90, and brackets 38 are substantially identical to the corresponding components of the main table 22. The rails 88, 90 telescopically receive the ends of the protruding portions 61, 62 of extension rods 58, 60. The auxiliary table 64 is suspended on the extension rods 58, 60 between the main table 22 and secondary table 78.

Locking members 92 are provided in order to form rigid connections between the extension rods 58, 60 and the tables 22, 64 and 78. As shown in FIG. 2, and in FIG. 4 for the auxiliary table 64, each locking member 92 is a capstan screw having a threaded shank 94 which extends through an opening 96 in the side wall 70 of the support plate 74. An opposite end 98 of the screw 92 is enlarged and extends through an opening 100 in rail 66, in registry with opening 96, to contact an inboard surface of the associated extension 58. A nut 102 is threaded on the shank 94 and is captured between the side wall 32 and a boss 104. The nut 102 is a square nut and is prevented from rotating by contact between the faces of the nut and the underside of the support plate 74. The capstan portion 106 of the capstan screw includes holes 108 shaped to receive a bar such as an allen wrench to facilitate turning of the capstan screw 92.

Rotation of the Capstan portion 106 causes the shank 94 to be displaced sidewardly relative to the nut 102, table 22 and associated rail 36. When the screw 92 displaced outwardly in this fashion, the end 98 clamps the extension 60 against an interior wall of the rail 66, thereby locking the extension to the rail and preventing relative movement therebetween. Rotation of the screw 92 to displace it inwardly releases the extension 60 from its clamped, locking engagement with the rail 66 and allows the extension to be slid relative to the rail.

The main table 22, auxiliary table 64 and secondary table 80 each include pairs of locking members 92 having constructions identical to that shown in FIG. 4. The auxiliary table 64 can be positioned on the extension rods 58, 60 then the associated locking members 92 actuated to lock the auxiliary table to the extension rods, so that the auxiliary table forms a rigid support frame with the main table 22. Similarly, the locking members 92 of the secondary table 78 can be actuated to connect the extension rods 58, 60 rigidly to the auxiliary table so that a rigid frame having three separate supporting surfaces is formed.

Figure 6:
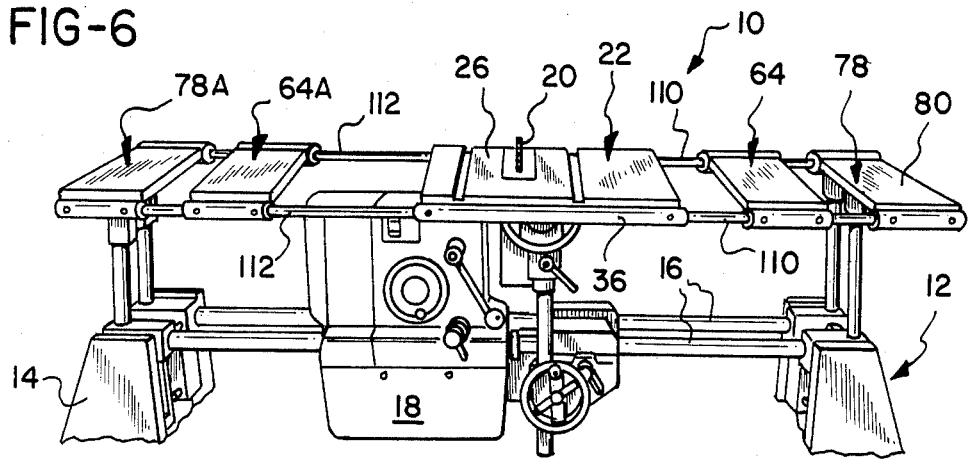
FIG. 6 is a perspective view of the support system of FIG. 1 in which auxiliary tables are mounted on both sides of the main table.

To provide a support system as shown in FIG. 6 in which auxiliary tables are on both sides of the main table 22, two sets of extension rods 110, 112 are used and are sufficiently long to extend from main table 22 to secondary table 78, and to secondary table 78A attached to the frame 14 at an end opposite table 78. Auxiliary tables 64 and 64A are supported by rods 110, 112 between secondary tables 78, 78A, respectively, and main table 22, thereby providing a work surface which extends the entire length of the frame 14. The tables 78A, 64A are identical to their counterparts 78, 64 and are attached to rods 112 in a similar manner.

An alternate embodiment of the support system 10' is shown in FIG. 5. In this system, the main table 22' is joined to the auxiliary table 64' by extension rods 58', 60' which are substantially shorter in length than extension rods 58, 60 shown in FIG. 2. Each of the extension rods 58', 60' includes a collar 114 located midway along its length, so that the extension rods can be fitted within the interiors of the rails 34', 36' the correct distance, leaving approximately half of the extension protruding from the rails. The protruding portions 61', 62' receive the rails 66', 68' of the auxiliary table 74' so that the auxiliary table is closely adjacent to the main table 22'. Once the auxiliary table 74' is so positioned, the locking members 92' are actuated to lock the extension rods 58', 60' to the tables.

The extension rods 58', 60' are used to provide a longer and substantially continuous workpiece supporting system as opposed to the structure shown in FIGS. 2 or 6 in which there is a gap between the main table 22 and auxiliary tables 64, 64A. The auxiliary table 64' can be attached to a side of the main table 22' opposite that shown in FIG. 5 simply be inserting the extension rods 58', 60' into opposite ends of the rails 34', 36' and locking the tables together in the manner previously described.

Figure 7:
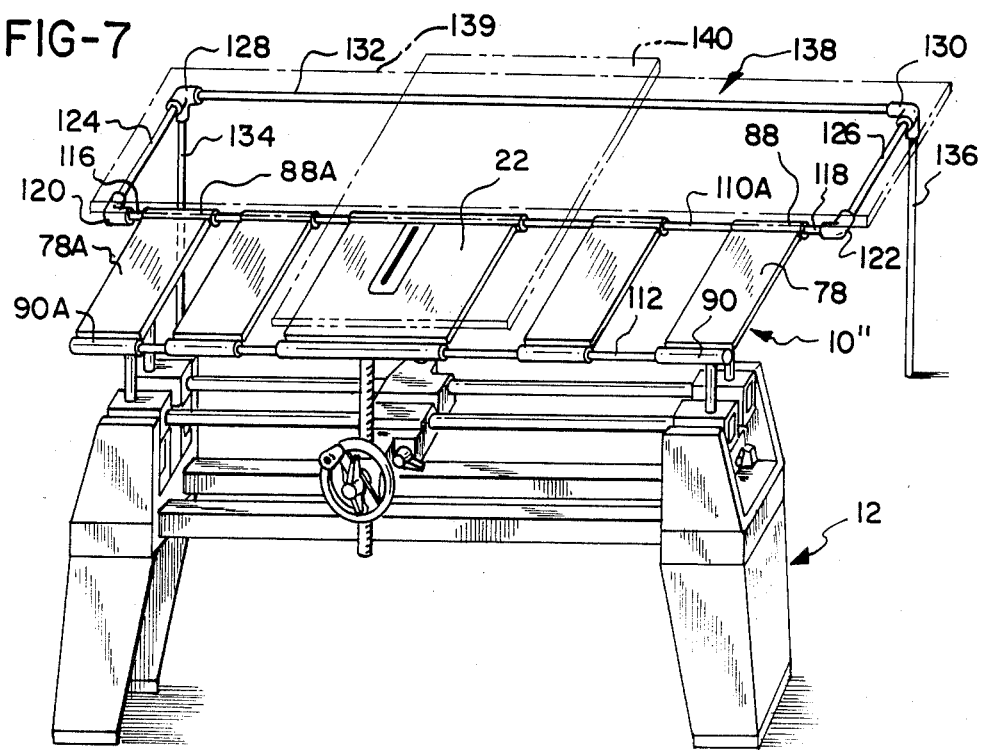
FIG. 7 is a perspective view of the support system of FIG. 1 in which a lateral support frame has been incorporated into the support.

In order to provide the capability of supporting relatively long workpieces for cutting by the table saw, the support system can be modified as shown in FIG. 7. The system 10" resembles that shown in FIG. 6 except that extension rod 110A is used, and is sufficiently long that its ends 116, 118 protrude outwardly from the rails 88A, 90A, 88, 90 of secondary tables 78A, 78, respectively.

Elbows 120, 122 are attached to the ends 116, 118, respectively, and in turn support tubular end sections 124, 126, respectively.

Three-way elbows 128, 130 are attached to the ends of tubular end sections 124, 126 and are joined together by a tubular side section 132. Legs 134, 136 are connected to and extend downwardly to the floor from three-way elbows 128, 130, respectively. These components combine to form a side frame, generally designated 138, which can be covered with a table surface such as a large plywood sheet 139 (shown in phantom) and which is capable of supporting large workpieces such as a cabinet door 140 (shown in phantom) as it is fed over the main table 22. The elbows 120, 122, 128, 130 are of well-known construction, and may comprise standard plumbing fittings. Similarly, the side sections 132 and end sections 124, 126 may comprise lengths of standard steel pipe.

Figure 9:
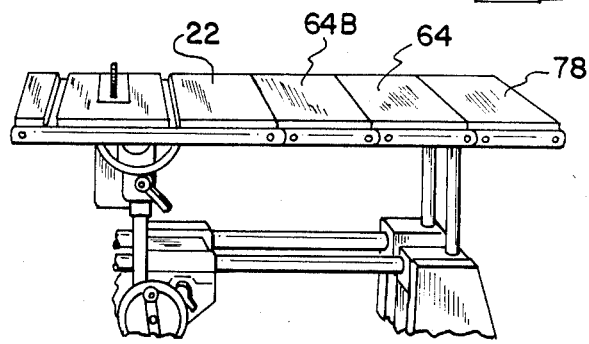
FIG. 9 is a perspective view of the support system of FIG. 1 in which two auxiliary tables have been suspended between the main and secondary tables to form a continuous surface therewith.

In some applications, it may be necessary to perform a cutting operation with a relatively wide, continuous work supporting surface. As shown in FIG. 9, this can be achieved by utilizing a second auxiliary table 64B in addition to auxiliary table 64 shown in FIG. 2. Auxiliary tables 64B and 64 are preferably sized such that they span the distance between the main table 22 and the secondary table 78. Main table 22, auxiliary tables 64B, 64 and secondary table 78 all are attached to the extension rods (not shown) in the manner previously described to form a continuous, rigid work supporting surface. It is understood that extension rods 110, 112, shown in FIG. 6 may be employed to form a continuous work supporting surface which extends from secondary table 78A to table 78 merely by placing a sufficient number of auxiliary tables between the secondary tables and the main table 22.

Figure 8:
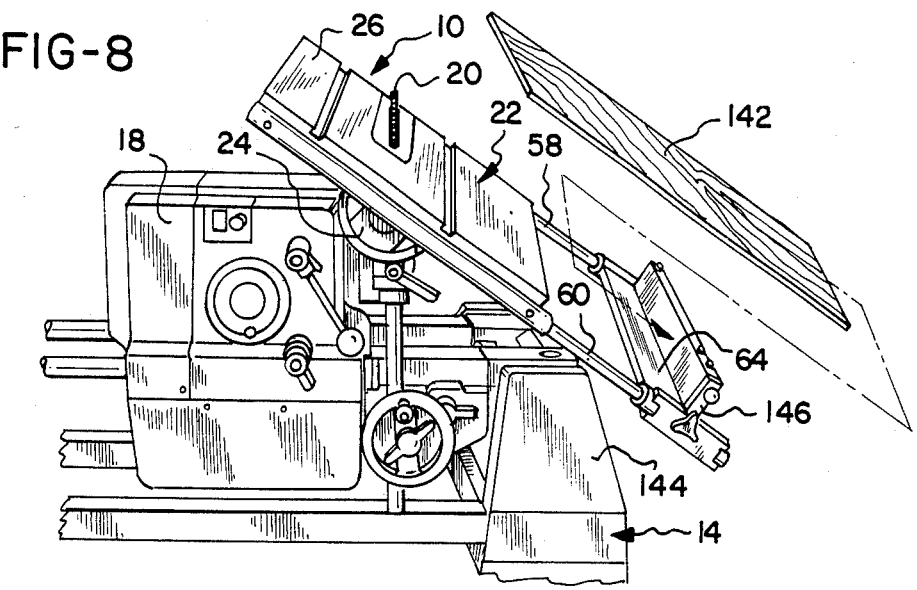
FIG. 8 is a perspective view of the support system of FIG. 1 in which the main and auxiliary tables are pivoted at an angle to the frame.

As shown in FIG. 8, another advantage of the support system 10 of the present invention is that it enables a bevel cut to be performed on a relatively large workpiece 142. The support system of the embodiment shown in FIG. 1 is adjusted by removing the secondary table 78 and displacing the main table 22 and headstock 18 to an end 144 of the frame 14. The pivotal support structure 24 is adjusted to orient the support plate 27 at an angle to the horizontal such as the 45° tilt shown in FIG. 8. The extension rods 58, 60 are positioned to extend toward end 144 and an auxiliary table 64 is attached to the ends of the rods.

A saw fence 146 of a conventional design is attached to auxiliary table 64 to provide a surface for guiding the workpiece 142 as it is fed past the saw blade 20. Since the saw blade 20 remains in a substantially vertical position, the slant of the support plate 26 causes the blade to make a beveled cut on the workpiece 142. An advantage of this system 10 is that the end of the workpiece 142 may be supported on an auxiliary table 64 which extends below the topmost portion of the end 144 of the frame 14, thereby allowing bevel cuts to be performed on relatively wide workpieces.

In order to add strength and rigidity to the support system, the rails and extension rods are made of continuous, cylindrically-shaped steel tubing; however, the extension rods may be made of solid steel. The cylindrical shape is preferable in that components of this shape are relatively inexpensive to fabricate and are readily available, and the circular cross sections minimize the likelihood of the extensions binding when moved relative to the rails.

While the forms of apparatus herein described constitute preferred embodiments of this invention, it is to be understood that the invention is not limited to these precise forms of apparatus, and that changes may be made therein without departing from the scope of the invention.

What is claimed is:

1. In a multipurpose power tool of the type having a frame, a main table mounted on said frame and a power-driven tool member associated with said main table, an improved support system comprising:

a first pair of tubular rails attached to opposing longitudinal sides of said main table and having hollow interiors extending therethrough;

an auxiliary table having a second pair of tubular rails having hollow interiors extending therethrough and attached to opposing longitudinal sides thereof;

a pair of rods sized to telescope into said interiors of said first pair of rails such that said rails are supported thereby, said rails protruding outwardly therefrom into said interiors of said second pair of rails such that said auxiliary table is supported by said rails;

first and second releasable locking means on said first and second pairs of rails, respectively, for locking said rods within said interiors such that said main table forms a rigid unit with said auxiliary table, and whereby said rods are positionable relative to said main table and said auxiliary table is independently positionable relative to said rods and said main table;

said first and second pairs of rails having ferrules extending inwardly therefrom attaching said rails in spaced relation to said main and secondary tables; and said locking means includes screw means having shanks displaceably attached to said main and said auxiliary tables, opposite ends extending through adjacent ones of said rails into said hollow interiors thereof, and means positioned between said tables and said rails for displacing said shanks sidewardly and outwardly from said tables in a locking position against said rods thereby locking said rods against said associated rails to prevent relative movement between said tables and said rods, or displacing said shanks inwardly from said locking position, thereby releasing said rods from locking engagement.

2. The support system of claim 1 wherein said tables include means threadedly engaging said shanks, and said displacing means comprises a plurality of capstan portions, each attached to one of said shanks.

3. In a multipurpose power tool of the type having, a frame, a substantially plate-shaped main table adjustably mounted to said frame, and a power driven tool member associated with said main table, the improvement comprising:

a first pair of substantially parallel, tubular rails, each rail having a cylindrical, longitudinal passage therethrough and attached to a longitudinal side of said main table;

pairs of cylindrical extension rods telescoping within said passages and including protruding portions extending outwardly from opposite ends of said first pair of rails;

a substantially plate-shaped auxiliary table having a substantially planar work surface, and a second pair of rails, each attached to a longitudinal side of said auxiliary table and having a cylindrical, longitudinal passage therethrough slidably receiving said protruding portions;

a pair of secondary tables mounted on opposite ends of said frame, each including a third pair of rails attached to longitudinal sides thereof and having longitudinal passages therethrough receiving ends of said protruding portions;

each of said main auxiliary and secondary tables including a pair of capstan screws having shanks threaded into said longitudinal sides thereof, opposite ends extending through adjacent ones of said rails, and capstan portions between said sides and said rails, such that rotation of said capstan screws in a first direction displaces said screws outwardly from said sides, thereby clamping said extension rods against said rails in a locked position, and rotation of said capstan screws in a reverse direction displaces said screws inwardly, thereby releasing said extension rods from said locking position;

one pair of said rods includes ends protruding outwardly from said secondary tables; and said support system includes a side frame having a pair of end sections attached to said rod ends and extending sidewardly therefrom, a side section attached to and extending between said end sections, leg means for supporting said side and end sections to lie in a substantially horizontal plane, and sheet means, supported by said end sections and said side section, positioned to receive and support workpieces as they are fed to a sawblade.

4. For use with a multipurpose tool of the type having a frame, a headstock mounted on the frame, and a power-driven tool member attached to an output shaft of the headstock, a workpiece support system comprising:

a main table adapted to be mounted on a multipurpose power tool frame;

a first pair of tubular rails attached to opposing longitudinal sides of said main table and having hollow interiors extending therethrough;

an auxiliary table having a second pair of tubular rails having hollow interiors extending therethrough and attached to opposing longitudinal sides thereof;

a pair of rods sized to telescope into said interiors of said first pair of rails such that said rails are supported thereby, said rails protruding outwardly therefrom into said interiors of said second pair of rails such that said auxiliary table is supported by said rails; and first and second releasable locking means on said first and second pairs of rails, respectively, for locking said rods within said interiors such that said main table forms a rigid unit with said auxiliary table, and whereby said rods are positionable relative to said main table and said auxiliary table is independently positionable relative to said rods and said main table;

said first and second pair of rails including ferrules extending inwardly therefrom attaching said rails in spaced relation to said main and secondary tables; and said locking means includes screw means having shanks displaceably attached to said main and said auxiliary tables, opposite ends extending through adjacent ones of said rails into said hollow interiors thereof and means positioned between said tables and said rails for displacing said shanks sidewardly and outwardly from said tables in a locking position against said rods thereby locking said rods against said associated rails to prevent relative movement between said tables and said rods, or displacing said shanks inwardly from said locking position, thereby releasing said rods from locking engagement.

5. The support system of claim 4 wherein said tables include means threadedly engaging said shanks, and said displacing means comprises a plurality of capstan portions each attached to one of said screws.

6. For use with a multipurpose power tool of the type having a frame, a headstock mounted on the frame, and a power-driven tool member attached to an output shaft of the headstock, a workpiece support system comprising:

a main table adapted to be mounted on a frame;

first rail means attached to opposing longitudinal sides of said main table and having a continuous, hollow interior;

rod means telescoping within said interiors of said first rail means;

an auxiliary table having second rail means attached to longitudinal sides thereof and having a continuous, hollow interior receiving said rod means therein and sized such that said auxiliary table is slidable relative to said main table;

said first and second rail means including first and second pairs of tubular rails, respectively; and rod means including a pair of tubular rods;

locking means including a plurality of capstan screws having shanks displaceably attached to said main and said auxiliary tables and opposite ends extending through adjacent ones of said rails, means for displacing said screws sidewardly and outwardly from said table, said displacing means including a plurality of capstan portions, each attached to one of said screws such that said extensions may be locked against said associated rails to prevent relative movement between said tables and said extensions, or displacing said screws inwardly, thereby releasing said extensions from locking engagement;

said tables including means threadedly engaging said shafts;

a secondary table adapted to be mounted on a frame supporting said main table and having a third pair of rails with continuous, hollow interiors, said rails receiving ends of said rods such that said auxiliary table is supported between said main table and said secondary table;

a second secondary table having a fourth pair of rails; one of said rods being sized to extend through said rails of said secondary tables such that ends thereof protrude outwardly from said rails; and a pair of end sections attached to and extending sidewardly from said ends, a side section attached to and extending between said end sections, and leg means for supporting said end and side sections.

7. For use with a multipurpose tool of the type having a frame, a headstock mounted on the frame and having a power-driven tool member attached to an output shaft thereof, a workpiece support system comprising:

a main table adapted to be mounted on a multipurpose power tool frame;

a first pair of tubular rails attached to opposing longitudinal sides of said main table and having hollow, continuous interiors extending therethrough;

an auxiliary table having a second pair of tubular rails having hollow, continuous interiors extending therethrough and attached to opposing longitudinal sides thereof;

a pair of rods sized to telescope into said interiors of said first pair of rails such that said rails are supported thereby, said rails protruding outwardly therefrom into said interiors of said second pair of rails such that said auxiliary table is supported by said rails;

first and second releasable locking means on said first and second pairs of rails, respectively, for locking said rods within said interiors such that said main table forms a rigid unit with said auxiliary table, and whereby said rods are positionable relative to said main table and said auxiliary table is independently positionable relative to said rods and said main table;

a secondary table adapted to be mounted on a multipurpose power tool frame supporting said main table and including a third pair of tubular rails extending along opposing ends thereof and having hollow, continuous interiors receiving ends of said rods such that said auxiliary table is supported between said main table and said secondary table and is selectively positionable therebetween, said third pair of rails including means for releasably locking said rods within said interiors thereof; and a second secondary table having a fourth pair of rails, one of said rods being sized to extend through said rails of said secondary tables such that ends thereof protrude outwardly from said rails, a pair of end sections attached to and extending sidewardly from said ends, a side section attached to and extending between said end sections, and leg means for supporting said end and side sections.

* * * * *

UNITED STATES PATENT AND TRADEMARK OFFICE
CERTIFICATE OF CORRECTION

PATENT NO. : 4,566,510

DATED : January 28, 1986

INVENTOR(S) : Robert L. Bartlett, Charles J. Haas, John G. Legler

It is certified that error appears in the above-identified patent and that said Letters Patent is hereby corrected as shown below:

Column 6, line 58, "be" should be --by--.

Column 10, line 10, "shanks" should be --shafts--.

Signed and Sealed this

Twenty-second Day of July 1986

[SEAL]

Attest:

DONALD J. QUIGG

Attesting Officer

Commissioner of Patents and Trademarks